March 7, 1961 D. A. BRIEF 2,973,955
PNEUMATIC SUSPENSION UNIT
Filed May 6, 1958 2 Sheets-Sheet 1

Daniel A. Brief
INVENTOR.

BY *Clarence A. O'Brien*
*and Harvey B. Jacobson*
Attorneys

March 7, 1961

D. A. BRIEF 2,973,955

PNEUMATIC SUSPENSION UNIT

Filed May 6, 1958

Daniel A. Brief
INVENTOR.

BY

United States Patent Office 2,973,955
Patented Mar. 7, 1961

2,973,955
PNEUMATIC SUSPENSION UNIT
Daniel A. Brief, 200 Donaldson St., San Antonio, Tex.
Filed May 6, 1958, Ser. No. 733,427
4 Claims. (Cl. 267—65)

This invention relates in general to new and useful improvements in pneumatic suspension units, and more specifically to a pneumatic suspension unit for vehicles, riding equipment, aircraft landing gear, or otherwise equipment where a spring, shock absorber and/or snubber is used and/or shock is desired to be absorbed. For the sake of brevity a vehicle will be used herein to designate the various uses and application of this invention.

The average vehicle which has been constructed in the past and which is now being constructed utilizes for the suspension thereof, particularly in conjunction with the front wheels, a coil spring, a shock absorber and a snubber. This is also true of the rear wheel construction of many vehicles and in the others the coil spring for the rear wheels is merely replaced by a leaf spring. Such an arrangement leaves much to be desired in the way of a comfortable ride.

It is therefore the primary object of this invention to provide a suspension unit for use in conjunction with automotive vehicles, the suspension unit being of a type which will economically replace existing springs, shock absorbers, and snubbers and at the same time which will provide a much more comfortable ride.

Another object of this invention is to provide an improved suspension unit for vehicles, the suspension unit being of the pneumatic type and which is so constructed whereby it will function to maintain the load imposed upon the vehicle and at the same time absorb shock which may be attempted to be transferred between the wheels and frame of the vehicle so as to provide a smooth ride.

Another object of this invention is to provide an improved pneumatic suspension unit for vehicles, the pneumatic suspension unit being so constructed whereby it has all of the desired ride qualities of pneumatic suspension units now on the market and at the same time is so constructed whereby it is automatically self-levelling so that the level of the vehicle remains constant irrespective of the particular load imposed thereon.

Another object of this invention is to provide an improved pneumatic suspension unit for vehicles, the suspension unit being so constructed whereby it may be readily mounted in the position normally occupied by coil spring of the vehicle.

These together with other objects and advantages which will become subsequently apparent reside in the details of construction and operation and more fully hereinafter described and claimed, reference being had to the accompanying drawings forming a part hereof, wherein like numerals refer to like parts throughout, and in which:

Figure 5:
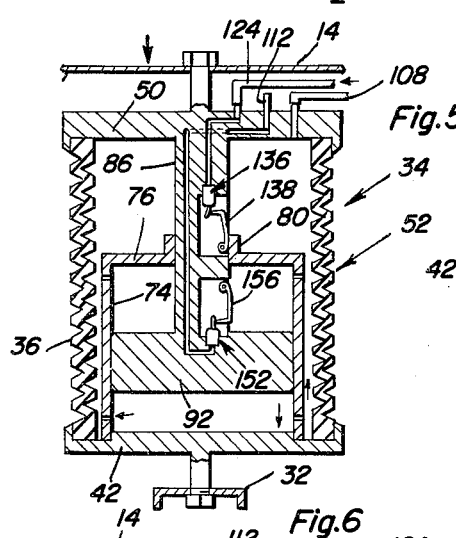
Figure 3:
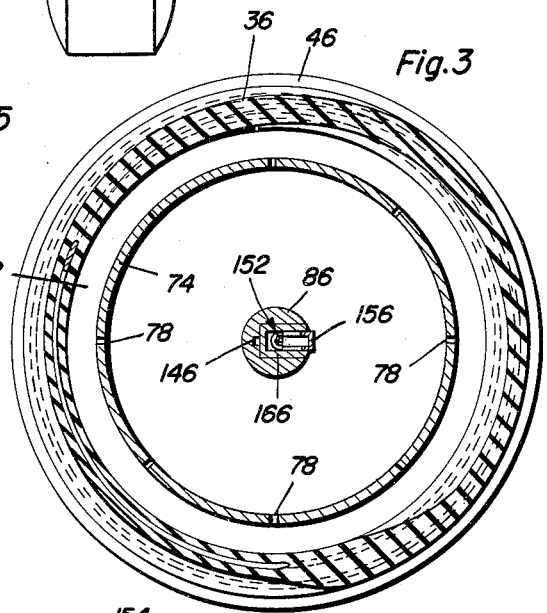
Figure 3 is an enlarged transverse sectional view taken substantially upon the plane indicated by the section line 3—3 of Figure 2 and shows further details of construction of the pneumatic suspension unit.
Figure 6:
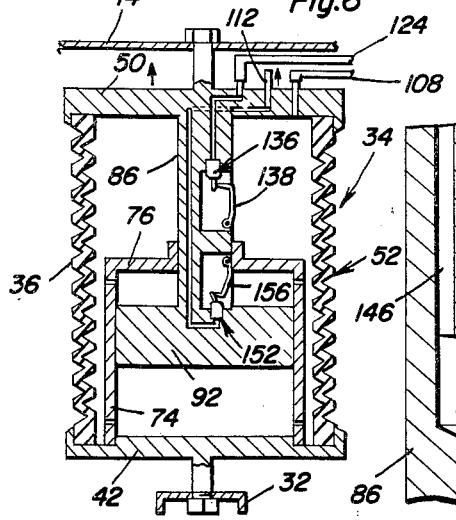

Figure 5 is a schematic view showing the alteration of one of the valves of the suspension unit for the purpose of admitting air under a high pressure to the interior of the suspension unit to compensate for a heavy load imposed thereupon and equalizing the level of the vehicle; and Figure 6 is a schematic sectional view similar to Figure 5 and shows the position of the components of the suspension unit for the purpose of stabilizing the level of the vehicle after a load has been removed from the suspension unit.

Figure 1:
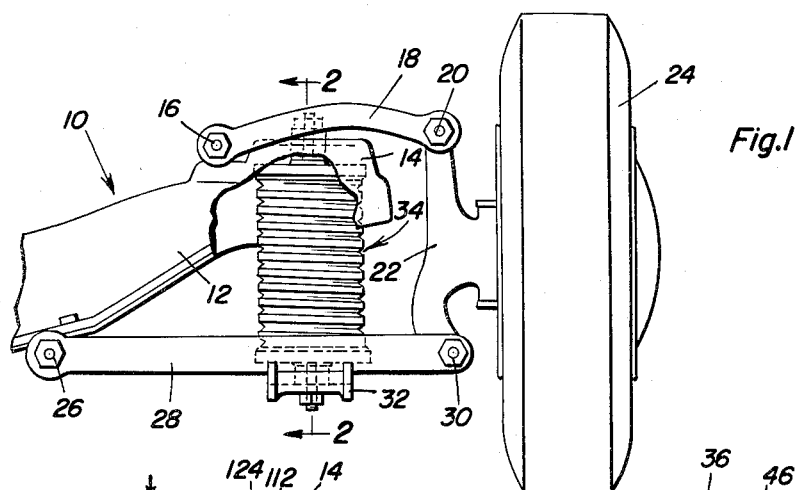
Figure 1 is a fragmentary elevational view of a front wheel suspension unit of a vehicle utilizing the pneumatic suspension unit which is the subject of this invention, a portion of the frame member of the vehicle being broken away for purposes of clarity.

Referring now to the drawings in detail, it will be seen that there is illustrated in Figure 1 a front wheel suspension unit which is referred to in general by the reference numeral 10. The front wheel suspension unit 10 includes a cross frame member 12 which terminates in a seat 14. Pivotally connected to the cross frame member 12 by means of a shaft 16 is an upper control arm 18. The upper control arm 18 is connected by means of a shaft 20 to a hanger 22 for a front wheel 24.

Also pivotally connected to the cross frame member 12 by means of a shaft 26 is a lower control arm 28. The lower control arm 28 is pivotally connected to the lower end of the hanger 22 by means of a shaft 30.

Extending between the seat 14 and a seat 32 carried by the lower control arm 28 is the pneumatic suspension unit which is the subject of this invention, the pneumatic suspension unit being referred to in general by the reference numeral 34. It will be noted that the pneumatic suspension unit 34 occupies the position normally occupied by a coil spring. It is also pointed out at this time that this is only one application of the pneumatic suspension unit 34 and the other applications will vary depending upon the particular vehicle construction or the particular use to which the suspension unit 34 is put.

Figure 2:
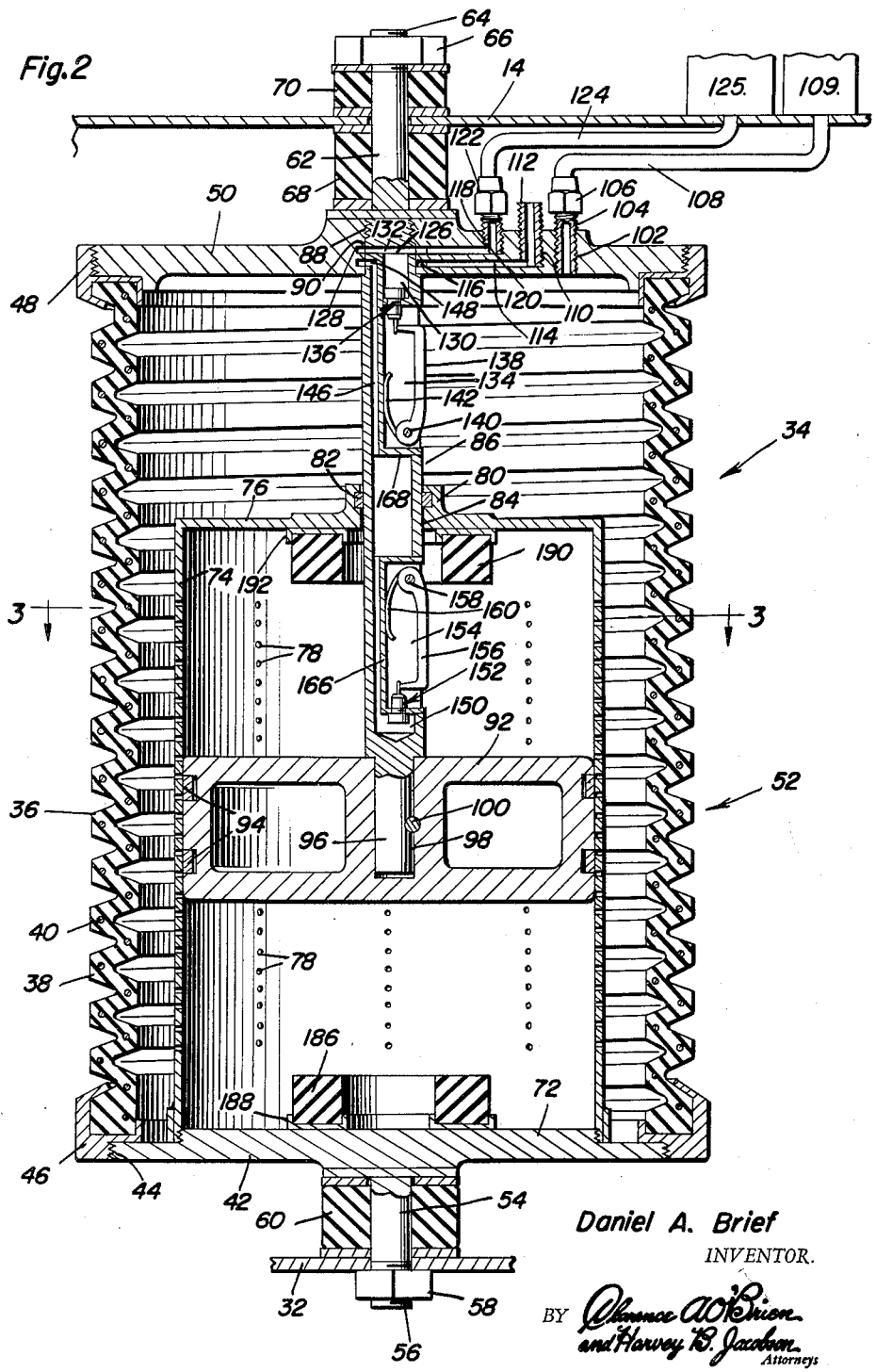
Figure 2 is an enlarged vertical sectional view taken substantially upon the plane indicated by the section line 2—2 of Figure 1 and shows the specific details of construction of the suspension unit which is the subject of this invention.

Referring now to Figure 2 in particular, it will be seen that the pneumatic suspension unit 34 includes an outer casing 36. The outer casing 36 is longitudinally compressible and expansible and is preferably in the form of a bellows. The outer casing 36 is formed of any suitable material 38 which may be available and it is reinforced by reinforcing wires 40 so as to have the desired strength.

The lower end of the outer casing 36 is closed by means of a bottom plate 42. The bottom plate 42 is provided with an externally threaded portion 44 which is in turn threadedly engaged with the fitting 46 which is clamped to and sealed to the lower end of the outer casing 36. A similar fitting 48 is used to connect a top plate 50 to the outer casing 36. The bottom plate 42, the outer casing 36 and the top plate 50 is provided to form a sealed unit which will be referred to in general by the reference numeral 52.

In order that the bottom plate 42 may be secured to the seat 32, there is provided a securing bolt 54 which depends from the center of the bottom plate 42. The securing bolt 54 includes an externally threaded lower end 56 on which there is threadedly engaged a nut 58. Disposed intermediate the seat 32 and the bottom plate 42 and carried by the bolt 54 is a resilient spacing unit 60 of the conventional type now used in conjunction with shock absorbers and the like.

In order to facilitate the mounting of the pneumatic suspension unit 34 with respect to the seat 14, there is provided a mounting bolt 62 which extends through the seat 14 and which terminates in an externally threaded portion 64 carrying a nut 66. Disposed intermediate the seat 14 and the top plate 50 is a resilient spacer 68 which is similar to the spacer 60. A similar, but thinner spacer 70 is disposed between the nut 66 and the seat 14.

The bottom plate 42 is provided with a reduced externally threaded projection 72 on the upper surface thereof. While the projection 72 is of a reduced diameter, it is still relatively large and has threadedly engaged therewith a lower end of an inner cylinder 74. The inner cylinder 74 is preferably formed of metal or other rigid material and has the upper end thereof closed by an end wall 76. A major portion of the cylinder 74 is provided with perforations 78.

The endwall 76 has formed integral with the upper surface thereof a boss 80 in which there is positioned a sealing ring 82. Extending through the boss 80 and through the end wall 76 is a bore 84 concentric to the sealing ring 82. Extending through the bore 84 is a piston rod 86. The piston rod 86 has a reduced externally threaded upper portion 88 which is threadedly engaged in a bore 90 formed in the under part of the upper plate 50 and opening through the under side thereof.

Disposed within the inner cylinder 74 is a piston 92. The piston 92 is provided with suitable sealing rings 94 extending about the periphery thereof and engaged with the inner wall of the inner cylinder 74. The piston rod 86 has a reduced end portion 96 which extends into a bore 98 formed in the center of the piston 92. The end 96 is locked to the piston 92 by means of a pin 100.

The top plate 50 is provided with an internally threaded bore 102 which extends all the way through the top plate 50. Threadedly engaged in the bore 102 is a tubular fitting 104 to which there is connected by means of a fitting 106 a low pressure fluid supply line 108 connected to a low pressure source 109. The low pressure fluid supply line 108 will be connected to any suitable low pressure fluid supply which will be preferably in the form of a low pressure fluid air tank whose pressure is provided by means of a small pump which may be driven from the motor of the vehicle from which the pneumatic suspension unit 34 is driven. The low pressure fluid supply line 108 will constantly supply air or other suitable fluid to the interior of the sealed unit 52. The pressure of the air being supplied to the sealed unit 52 through the low pressure fluid supply line 108 will be sufficient to normally compensate for the weight of the vehicle as applied to the pneumatic suspension unit 34.

Opening through the upper surface of the top plate 50 and extending thereinto a considerable distance is an internally theraded bore 110 in which there is threadedly engaged a tubular fitting 112. The upper end of the fitting 112 is open to the atmosphere. A transverse vent passage 114 is formed in the upper plate 50 and communicated with the lower end of the bore 110 and the interior of the fitting 112. The transverse vent passage 114 terminates at the opposite end thereof in an annular vent passage 116 which surrounds the bore 90.

A third internally threaded bore 118 is formed in the top plate 50. The bore 118 is shorter than the bore 110 and has threadedly engaged therein a tubular fitting 120. The tubular fitting 120 has connected thereto by means of a fitting 122 a high pressure fluid supply line 124 connected to a high pressure source 125. It is to be understood that the heighth of pressure of the fluid in the high pressure supply line 124 is high as compared to the pressure of the fluid in the low pressure fluid supply line 108. Extending transversely through the plate 50 and opening into the lower end of the bore 118 and communicating with the interior of the fitting 120 is a high pressure fluid passage 126 which in turn opens at its opposite end into an annular passage 128.

Formed in the piston rod 86 is a high pressure fluid passage 130 formed adjacent to an upper portion 132 of piston rod 86. The passage 130 opens into the annular passage 128. Disposed in the lower end of the high pressure fluid passage 130 and opening into a chamber 134 is a flow control valve 136. The flow control valve 136 is normally closed and is opened by means of an operator 138 disposed within the chamber 134 and pivotally mounted with respect to the piston rod 86 on a pivot pin 140. Also disposed within the chamber 134 is a spring 142 which normally urges the operator 138 to a position slightly projecting from the chamber 134 for a reason to be described in more detail hereinafter.

Also formed in the piston rod 86 is a longitudinally extending vent passage 146 which has an upper portion 148 opening into the annular passage 116. The lower end of the vent passage 146 opens into an enlarged portion 150 in which there is positioned a flow control valve 152. The flow control valve 152 opens into a chamber 154 formed in the piston rod 86.

Disposed within the chamber 154 for operating the flow control valve 152 is an operator 156. The flow control valve 152 is normally closed and is operated by means of the operator 156 to move it to an open position. The operator 156 is pivotally mounted on a pivot pin 158 carried by the piston rod 86. A spring 160 disposed within the chamber 154 cooperates with the operator 156 to urge it to a position slightly out of the chamber 154 and inoperative relative to the flow control valve 152.

Figure 4:
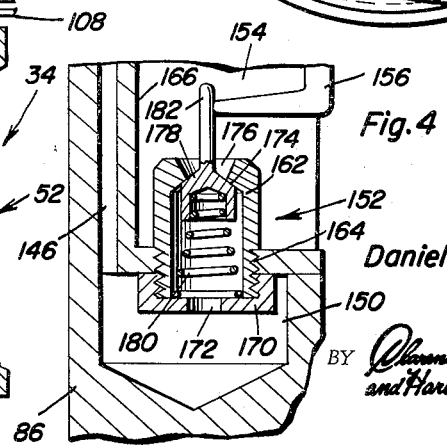
Figure 4 is an enlarged fragmentary sectional view taken through a lower part of the piston rod of the suspension unit and shows the specific details of the construction and one of the valves carried thereby.

The flow control valves 136 nd 152 are identical and accordingly only the flow control valve 152 will be described in detail hereinafter. As is best shown in Figure 4, the flow control valve 152 includes a valve body 162 which is threadedly engaged in a bore 164 formed in a lower part of a generally C-shaped housing 166 which is mounted within the piston rod and which defines the chamber 154. Incidentally, a similar housing 168 defines the chamber 134, as is best shown in Figure 2. The valve body 162 projects through the housing 166 down into the enlarged portion 150 and has threadedly engaged thereon a cap 170 with an opening 172 therethrough. The upper part of the valve body 162 is in the form of a valve seat 174. Disposed within the valve body 162 and normally engaging the valve seat 174 to close the opening 176 through the valve body 162 about which the valve seat 174 extends is a valve member 178. The valve member 178 is urged into sealing engagement with the valve seat 174 by means of a spring 180 which seats upon the cap 170. The valve member 174 has connected thereto a pin-like actuator 182 which extends through the opening 176 and into alignment with the operator 156.

In order to resiliently stop the downward movement of the piston 92, there is mounted on the plate 42 a resilient buffer member 186. The buffer member 186 is supported by means of a bracket 188. A similar buffer member 190 is mounted on the plate 76 and is retained in place by a retainer 192.

In the use of the present invention, the low pressure fluid supply will be of sufficient pressure to support the weight which is imposed upon the particular suspension unit 34. Thus, the suspension unit 34 would normally assume the position illustrated in Figure 2. Of course, due to road shocks and the like the dispensing unit 34 will collapse and expand to compensate for such road shocks. The operation of the suspension unit 34 will be similar to those which are normally in use. Further, the suspension unit 34 will also function as a shock absorber.

When the vehicle of which the suspension unit 34 is a part is loaded, for example by the placing of materials in the trunk or by the addition of passengers, the increased load will momentarily cause the compression of the suspension unit 34 so that it will assume the position illustrated in Figure 5. After the piston 92 and the piston rod 86 have moved downwardly a short distance, the actuator 138 would engage the boss 80 of the top wall 76 and as a result will open the valve 136. This will admit fluid under a high pressure into the sealed unit 52 and as a result, the plate 50 will move upwardly until such time as the actuator 138 no longer engages the boss 80 at which time the valve 136 will again close and the suspension unit 34 will be in its state of equilibrium similar to Figure 2. Thus, the additional load placed on a suspension unit 34 will automatically be compensated for and the vehicle returned to its level condition.

On the other hand, should the load be removed from the suspension unit 34, then the suspension unit 34 will elongate, as is shown in Figure 6. The relative upward movement of the piston rod 86 with respect to the end walls 76 will result in the engagement of the actuator 156 with the wall 76 and the resultant opening of the valve 152. This will vent the interior of the sealed unit 52 to the atmosphere until such time as the piston rod 86 moves downwardly to its normal position such as that illustrated in Figure 2. Thus once again the vehicle will be level.

The piston 92, by traveling in the inner cylinder 74 will function as a shock absorber through the controlled escape of fluid through the apertures 78. Thus any relative movement between the plates 50 and 42 will result in a shock absorbing action by the piston 92.

From the foregoing, it will be seen that there has been devised a suspension unit which may be used in conjunction with vehicles of existing and future construction and which suspension unit may replace both the normal coil spring and shock absorber of such vehicle and will serve not only to provide a comfortable ride, as is desired, but will automatically level the vehicle under all load conditions.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A pneumatic suspension unit for vehicles comprising an endwise expansible and compressible outer casing, top and bottom plates recured to opposite ends of said outer casing in sealed relation to form a sealed unit, anchoring means carried by said top and bottom plates for mounting said sealed unit, an inner cylinder secured to one of said plates and projecting into said outer casing, an end wall closing the end of said inner cylinder remote from the other of said plates, said end wall being spaced from the other of said plates, a piston rod fixedly secured to said other plate and projecting into said outer casing, an imperforate piston disposed within said inner cylinder in sealed relation, said piston rod extending through said end wall and being connected to said piston said inner cylinder being perforated on opposite sides of said piston, means for continuously supplying low pressure fluid to said sealed unit, means for the controlled supplying of high pressure fluid to said sealed unit, and means for the controlled venting of fluid from said sealed unit for compensating for variations in loads imposed on said suspension unit, said means for the controlled supply of high pressure fluid to said sealed unit including a high pressure fluid passage through said piston rod, a high pressure fluid supply line connected to said high pressure fluid passage, and a control valve, said control valve being carried by said piston rod and including an operator engageable with said end wall in response to relative movement between said piston rod and said end wall.

2. A pneumatic suspension unit for vehicles comprising an endwise expansible and compressible outer casing, top and bottom plates secured to opposite ends of said outer casing in sealed relation to form a sealed unit, anchoring means carried by said top and bottom plates for mounting said sealed unit, an inner cylinder secured to one of said plates and projecting into said outer casing, an end wall closing the end of said inner cylinder remote from one plate, said end wall being spaced from the other of said plates, a piston rod fixedly secured to said other plate and projecting into said outer casing, an imperforate piston disposed within said inner cylinder in sealed relation, said piston rod extending through said end wall and being connected to said piston, said inner cylinder being perforated on opposite sides of said piston, means for continuously supplying low pressure fluid to said sealed unit, means for the controlled supplying of high pressure fluid to said sealed unit, and means for the controlled venting of fluid from said sealed unit for compensating for variations in loads imposed on said suspension unit, said means for the controlled venting of fluid from said sealed unit including a vent passage in said piston rod, a vent line connected to said vent passage, and a control valve, said control valve being carried by said piston rod and including an operator engageable with said end wall in response to relative movement between said piston rod and said end wall.

3. A pneumatic suspension unit for vehicles comprising an endwise expansible and compressible outer casing, top and bottom plates secured to opposite ends of said outer casing in sealed relation to form a sealed unit, anchoring means carried by said top and bottom plates for mounting said sealed unit, an inner cylinder secured to one of said plates and projecting into said outer casing, an end wall closing the end of said inner cylinder remote from one plate, said end wall being spaced from the other of said plates, a piston rod fixedly secured to said other plate and projecting into said outer casing, an imperforate piston disposed within said inner cylinder in sealed relation, said piston rod extending through said end wall and being connected to said piston said inner cylinder being perforated on opposite sides of said piston, means for continuously supplying low pressure fluid to said sealed unit, means for the controlled supplying of high pressure fluid to said sealed unit, and means for the controlled venting of fluid from said sealed unit for compensating for variations in loads imposed on said suspension unit, said means for the controlled supply of high pressure fluid to said sealed unit including a high pressure fluid passage through said piston rod, a high pressure fluid supply line connected to said high pressure fluid passage, and a control valve, said means for the controlled venting of fluid from said sealed unit including a vent passage in said piston rod, a vent line connected to said vent passage, and a control valve, each of said control valves being carried by said piston rod and including an operator engageable with said end wall in response to relative movement between said piston rod and said end wall.

4. A pneumatic suspension unit for vehicles comprising an endwise expansible and compressible outer casing, top and bottom plates secured to opposite ends of said outer casing in sealed relation to form a sealed unit, anchoring means carried by said top and bottom plates for mounting said sealed unit, an inner cylinder secured to one of said plates and projecting into said outer casing, an end wall closing the end of said inner cylinder remote from one plate, said end wall being spaced from the other of said plates, a piston rod fixedly secured to said other plate and projecting into said outer casing, an imperforate piston disposed within said inner cylinder in sealed relation, said piston rod extending through said end wall and being connected to said piston said inner cylinder being perforated on opposite sides of said piston, means for continuously supplying low pressure fluid to said sealed unit, means for the controlled supplying of high pressure fluid to said sealed unit, and means for the controlled venting of fluid from said sealed unit for compensating for variations in loads imposed on said suspension unit, said means for the controlled supply of high pressure fluid to said sealed unit including a high pressure fluid passage through said piston rod, a high pressure fluid supply line connected to said high pressure fluid passage, and a control valve, said means for the controlled venting of fluid from said sealed unit including a vent passage in said piston rod, a vent line connected to said vent passage, and a control valve, each of said control valves being carried by said piston rod and including an operator engageable with said end wall in response to relative movement between said piston rod and said end wall, said operators being disposed on opposite sides of said end wall.

References Cited in the file of this patent
UNITED STATES PATENTS

| | | |
|---|---|---|
| 1,373,315 | Dunn | Mar. 29, 1921 |
| 2,056,106 | Kuhn | Sept. 29, 1936 |
| 2,249,530 | Kollsman | July 15, 1941 |
| 2,359,687 | Stelzer | Oct. 3, 1944 |
| 2,691,420 | Fox | Oct. 12, 1954 |
| 2,790,650 | Boschi | Apr. 30, 1957 |